United States Patent
Blasco Serrano et al.

(10) Patent No.: US 11,470,622 B2
(45) Date of Patent: Oct. 11, 2022

(54) METHOD FOR SCHEDULING VEHICLE-TO-VEHICLE COMMUNICATIONS

(71) Applicant: TELEFONAKTIEBOLAGET LM ERICSSON (PUBL), Stockholm (SE)

(72) Inventors: Ricardo Blasco Serrano, Stockholm (SE); Stefano Sorrentino, Solna (SE); Hieu Do, Järfälla (SE)

(73) Assignee: TELEFONAKTIEBOLAGET LM ERICSSON, Stockholm (SE)

(*) Notice: Subject to any disclaimer, the term of this patent is extended or adjusted under 35 U.S.C. 154(b) by 1232 days.

(21) Appl. No.: 15/473,785

(22) Filed: Mar. 30, 2017

(65) Prior Publication Data
US 2017/0290033 A1    Oct. 5, 2017

Related U.S. Application Data

(60) Provisional application No. 62/316,876, filed on Apr. 1, 2016.

(51) Int. Cl.
H04W 72/04 (2009.01)
H04W 72/12 (2009.01)
(Continued)

(52) U.S. Cl.
CPC ....... *H04W 72/1205* (2013.01); *H04W 28/26* (2013.01); *H04L 49/90* (2013.01); *H04W 72/1284* (2013.01); *H04W 92/18* (2013.01)

(58) Field of Classification Search
CPC .............................. H04W 72/04; H04W 88/08
See application file for complete search history.

(56) References Cited

U.S. PATENT DOCUMENTS 5,812,545 A * 9/1998 Liebowitz .......... H04B 7/18523
                                                                370/337
6,707,821 B1 * 3/2004 Shaffer ............... H04L 47/2416
                                                                370/347
(Continued)

FOREIGN PATENT DOCUMENTS

EP      2928252 A1    10/2015
WO   2008108698 A1     9/2008
WO   2015139268 A1     9/2015

OTHER PUBLICATIONS

Ericsson: "Discussion on V2X PC5 Scheduling, Resource Pools and Resource Patterns", 3GPP Draft; R1-161075, 3GPP TSG RAN WG1 Meeting #84, Feb. 15-19, 2016, Malta.

(Continued)

*Primary Examiner* — Hassan A Phillips
*Assistant Examiner* — Prenell P Jones

(57) ABSTRACT

A system, communication device, and method for scheduling transmissions from the communication device. The device predicts an arrival time of a next packet for transmission when a current packet arrives in a transmission buffer. The device plans a future transmission time of the next packet based on the predicted arrival time of the next packet, and books transmission resources for the planned future transmission time. If the next packet has arrived a Tdrop time period before the planned future transmission time, the device transmits the next packet. If the next packet has not arrived at that time, the device re-plans the future transmission time of the next packet. The device may then unbook the transmission resources for the planned future transmission time, book transmission resources for the re-planned future transmission time, and notify other communication devices that the unbooked transmission resources are available for use by the other communication devices.

33 Claims, 6 Drawing Sheets

(51) Int. Cl.
*H04W 28/26* (2009.01)
*H04W 92/18* (2009.01)
*H04L 49/90* (2022.01)

(56) References Cited

U.S. PATENT DOCUMENTS

| | | | | |
|---|---|---|---|---|
| 6,724,726 | B1* | 4/2004 | Coudreuse | H04Q 11/0478 370/229 |
| 7,551,603 | B1* | 6/2009 | Shaffer | H04L 47/2416 370/252 |
| 2002/0082811 | A1* | 6/2002 | Honjas | G06Q 10/04 703/2 |
| 2006/0114862 | A1* | 6/2006 | Hiraoka | H04B 7/2656 370/337 |
| 2007/0002821 | A1* | 1/2007 | Carlson | H04L 29/06 370/349 |
| 2008/0298235 | A1* | 12/2008 | Neugebauer | H04L 43/0864 370/232 |
| 2009/0312010 | A1* | 12/2009 | Hall | H04W 72/1215 455/426.1 |
| 2012/0128010 | A1* | 5/2012 | Huang | H04L 1/0009 370/468 |
| 2014/0050210 | A1* | 2/2014 | Waters | H04W 4/02 370/338 |
| 2014/0095123 | A1* | 4/2014 | Patnaik | G01N 33/0075 703/2 |
| 2015/0078297 | A1* | 3/2015 | Zheng | H04W 76/14 370/329 |
| 2015/0092656 | A1* | 4/2015 | Lindh | H04W 72/121 370/312 |
| 2015/0163810 | A1* | 6/2015 | Chou | H04W 24/02 455/436 |
| 2015/0271818 | A1* | 9/2015 | Tavildar | H04B 1/69 375/138 |
| 2015/0365997 | A1* | 12/2015 | Jeong | H04W 52/0235 370/311 |
| 2016/0088617 | A1* | 3/2016 | Goldhamer | H04L 1/18 370/330 |
| 2016/0255562 | A1* | 9/2016 | Sharma | H04L 67/104 370/331 |
| 2016/0295624 | A1* | 10/2016 | Novlan | H04W 76/14 |
| 2017/0019918 | A1* | 1/2017 | Voigt | H04W 72/14 |
| 2017/0150527 | A1* | 5/2017 | Duval | H04W 8/005 |
| 2017/0237474 | A1* | 8/2017 | Haran | H04B 1/3822 455/78 |
| 2017/0332380 | A1* | 11/2017 | Kronander | H04W 74/00 |

OTHER PUBLICATIONS

Ericsson: "Sidelink Resource Allocation in V2X", 3GPP Draft; R2-161566, 3GPP TSG-RAN WG2 #93, Malta, Feb. 15-19, 2016.
3GPP TR 22.885 V14.0.0 (Dec. 2015) "3rd Generation Partnership Project; Technical Specification Group Services and System Aspects; Study on LTE support for Vehicle to Everything (V2X) services (Release 14)", pp. 1-50, Dec. 2015.
3GPP TS 36.101 V12.11.0 (Mar. 2016) "3rd Generation Partnership Project; Technical Specification Group Radio Access Network; Evolved Universal Terrestrial Radio Access (E-UTRA); User Equipment (UE) radio transmission and reception (Release 12)", pp. 1-769, Mar. 2016.

* cited by examiner

METHOD FOR SCHEDULING VEHICLE-TO-VEHICLE COMMUNICATIONS

CROSS-REFERENCE TO RELATED APPLICATIONS

This application claims the priority benefit under 35 U.S.C. § 119(e) of U.S. Provisional Application No. 62/316,876 filed on Apr. 1, 2016, the disclosure of which is incorporated herein by reference in its entirety.

TECHNICAL FIELD

The present disclosure relates generally to communication systems and more particularly to a method of scheduling Vehicle-to-Vehicle (V2V) communications.

BACKGROUND

During Release 12 of 3GPP TS 36.101, the LTE standard has been extended with support of Device-to-Device (D2D) (specified as "sidelink") features targeting both commercial and Public Safety applications. Applications enabled by Rel-12 LTE include device discovery, where devices are able to sense the proximity of another device and associated application by broadcasting and detecting discovery messages that carry device and application identities. Another application consists of direct communication based on physical channels terminated directly between devices.

FIG. 1 is an illustrative drawing illustrating various vehicle communication scenarios in an LTE-based network, such as Vehicle-to-Vehicle (V2V) 1, Vehicle-to-Pedestrian (V2P) 2, and Vehicle-to-Infrastructure (V2I) 3 communications. One of the potential extensions for the D2D work consists of support of Vehicle-to-Anything (V2X) communication, which includes any combination of direct communication between vehicles 4, pedestrians 5, and infrastructure 6. V2X traffic is expected to be highly dynamic, both geographically and time-wise. Also, specific services (V2I, V2P, V2V) are associated with different radio requirements, typical loads, and other constraints.

V2X communication may take advantage of the network infrastructure, when available, but basic V2X connectivity should at least be possible even in case of lack of network coverage. Providing an LTE-based V2X interface may be economically advantageous because of the LTE economies of scale, and it may enable tighter integration between V2I communications, V2P communications, and V2V communications, as compared to using a dedicated V2X technology.

V2X communications may carry both non-safety and safety information, where each of the applications and services may be associated with specific requirements sets, e.g., in terms of latency, reliability, capacity, and the like.

The European Telecommunications Standards Institute (ETSI) has defined two types of messages for road safety: Co-operative Awareness Message (CAM) and Decentralized Environmental Notification Message (DENM).

The CAM message is intended to enable vehicles, including emergency vehicles, to notify their presence and other relevant parameters in a broadcast fashion. Such messages target other vehicles, pedestrians, and infrastructure, and are handled by their applications. CAM messages also serve as active assistance to safety driving for normal traffic. The availability of a CAM message is determined every 100 ms, yielding a maximum detection latency requirement of <=100 ms for most messages. However, the latency requirement for pre-crash sensing warning is 50 ms.

The DENM message is event-triggered, such as by braking, and the availability of a DENM message is also determined every 100 ms. The requirement of maximum latency is <=100 ms.

The package size of CAM and DENM messages varies from 100+ to 800+ bytes and the typical size is around 300 bytes. The messages are supposed to be detected by all vehicles in proximity.

The Society of Automotive Engineers (SAE) also defined a Basic Safety Message (BSM) for Dedicated Short-Range Communications (DSRC) with various message sizes defined. According to the importance and urgency of the messages, the BSMs are further classified into different priorities.

V2V Traffic Patterns

In V2V communications, two major types of traffic are distinguished: recurrent traffic and event-triggered traffic. The present disclosure focuses on recurrent traffic.

Recurrent traffic (sometimes erroneously referred to as periodic traffic) constitutes the largest portion of V2V traffic and includes the transmission of CAM messages. CAM messages are generated by higher layer applications according to a set of rules. These rules depend on factors such as vehicle speed, steering angle, and so on. Consequently, traffic is generated at irregular time intervals. Nevertheless, the rules specify that the traffic is generated in a recurrent manner. In fact, over short periods of time, the traffic may follow some periodicity, for example because the speed and steering angle of a car may not vary for several seconds.

SUMMARY

It is an object of the present disclosure to provide a method for scheduling the transmission of packets without being constrained to utilizing totally synchronous/asynchronous scheduling procedures. The method combines predicting the arrival of new packets (to the L2 transmit buffer of the UE) with mechanisms for booking resources for future transmission. The method also includes mechanisms for unbooking previously booked resources in case a packet does not arrive (to the L2 transmit buffer of the UE) within a predicted time.

Current solutions for scheduling V2X transmissions by a single UE fall into two categories: asynchronous and synchronous. When scheduling transmissions in an asynchronous manner, each transmission by a UE is scheduled independently. When scheduling transmission in a synchronous or periodic manner, the transmissions by a UE are scheduled in a highly dependent manner. For example, a UE may be scheduled for transmission according to a fixed periodicity (e.g., every X seconds) or according to some repeating pattern. Both solutions have disadvantage.

Asynchronous scheduling is inherently unpredictable. This unpredictability leads to collisions when the medium is shared by multiple UEs that perform distributed scheduling (as opposed to centralized scheduling). This leads to degraded system performance. On the other hand, synchronous scheduling is inherently inflexible. That means that if the traffic deviates from the scheduling pattern, the system behaves inefficiently. In some cases, a UE may be forced to drop packets (for example because too few transmission opportunities are scheduled). In some other cases, a UE may not use all the scheduling opportunities (for example because too many transmission opportunities are scheduled), leading to degraded system performance and reduced system capacity. This is particularly relevant for the type of traffic found in V2V communications, as explained above, but is, in general, relevant for all situations where a group of UEs is involved in a common communication (sharing a medium) and transmission scheduling is distributed among the group members.

An object of the present disclosure may be regarded as providing efficient measures for V2X communication for transmission of packets which may be asynchronously scheduled.

The current disclosure presents, among others, a method for scheduling the transmissions of packets that may arrive regularly but might not be strictly periodic (for example with deviations from the expected arrival time or with deviations from the average periodicity). The method may allow receiving devices to predict the future utilization of the (e.g., radio) resources. The method enables a device to predict the arrival time (to the transmit buffer) of future packets based on the time of arrival of previous packets.

The method may also enable a device to book resources in advance for transmission using the predicted time of arrival of the next packet. This may allow other devices to predict future utilization of the (e.g., radio) resources.

According to a first embodiment, a method of scheduling transmissions from a communication device is provided. The method includes predicting an arrival time of a next packet for transmission when or after a current packet arrives; planning a future transmission time of the next packet based on the predicted arrival time of the next packet; and booking transmission resources for the planned future transmission time of the next packet.

According to a further embodiment, a communication device is provided. The device includes a processor; a non-transitory memory for storing instructions executable by the processor; a transmit buffer connected to the processor; and an interface connected to the processor for transmitting packets from the communication device. Wherein, when or after a current packet arrives in the transmit buffer, the processor is configured to execute the instructions in the memory, thereby causing the processor to predict an arrival time of a next packet for transmission, plan a future transmission time of the next packet based on the predicted arrival time of the next packet, and book transmission resources for the planned future transmission time of the next packet.

According to a further embodiment, a system for scheduling transmissions from a plurality of communication devices involved in a communication using a shared medium is provided. The system includes, within each of the plurality of communication devices, an apparatus comprising a processor; a storage unit for storing instructions executable by the processor and for buffering packets to be transmitted; and an interface connected to the processor for transmitting packets from the communication device. Wherein, when or after a current packet arrives in the storage unit, the processor is configured to execute the instructions in the storage unit, thereby causing the processor to predict an arrival time of a next packet for transmission, plan a future transmission time of the next packet based on the predicted arrival time of the next packet, book transmission resources for the planned future transmission time of the next packet, and notify other communication devices of the booked transmission resources.

According to a further embodiment, a communication device within a plurality of communication devices involved in a communication using a shared medium is provided. The device includes, a processor; a non-transitory memory for storing instructions executable by the processor; and an interface connected to the processor for communicating with other communication devices within the plurality of communication devices. Wherein, the processor is configured to execute the instructions in the memory, thereby causing the processor to receive information about a planned transmission time by another communication device within the plurality of communication devices, and avoid using the planned transmission time.

The solution according to the present disclosure provides a number of advantages. The solution may allow a device to schedule the transmission of packets that arrive regularly but are not strictly periodic without being constrained to utilizing totally synchronous/asynchronous scheduling procedures. Advantages over totally synchronous scheduling are that resources are more efficiently utilized and system capacity is increased. Advantages over totally asynchronous scheduling procedure are that the reliability of the scheduling process is improved, and other devices are able to predict future utilization of the resources. This information may be useful for avoiding collisions when scheduling their own transmissions.

Further features and benefits of embodiments of the present disclosure will become apparent from the detailed description below.

BRIEF DESCRIPTION OF THE DRAWINGS

In the following section, the invention will be described with reference to exemplary embodiments illustrated in the figures, in which.

DETAILED DESCRIPTION

The present invention will now be described more fully hereinafter with reference to the accompanying drawings, in which preferred embodiments of the invention are shown. In the below, for purposes of explanation and not limitation, specific details are set forth in order to provide a thorough understanding of the present invention. It will be apparent to one skilled in the art that the present invention may be practiced in other embodiments that depart from these specific details.

Those skilled in the art will further appreciate that the functions explained herein below may be implemented using hardware circuitry or a combination of hardware and software. The software may operate in conjunction with a programmed microprocessor or a general purpose computer, using an Application Specific Integrated Circuit (ASIC) and/or Digital Signal Processors (DSPs). It will also be apparent that when the present invention is described as a method, it may also be embodied in a computer processor and a non-transitory memory coupled to the processor, wherein the memory is encoded with one or more programs that perform the method when executed by the processor.

The following disclosure is applicable to scenarios where messages are transmitted regularly but do not follow any exact periodicity. It is particularly applicable to those scenarios in which predictability of device behavior is beneficial. Without limitation, the device is reverenced in the following as a User Equipment (UE) although other mobile communication devices may be utilized.

The disclosed solution can be used in a V2X environment but could also be applied in numerous other environments such as a group of UEs connected in a network slice.

Figure 1:
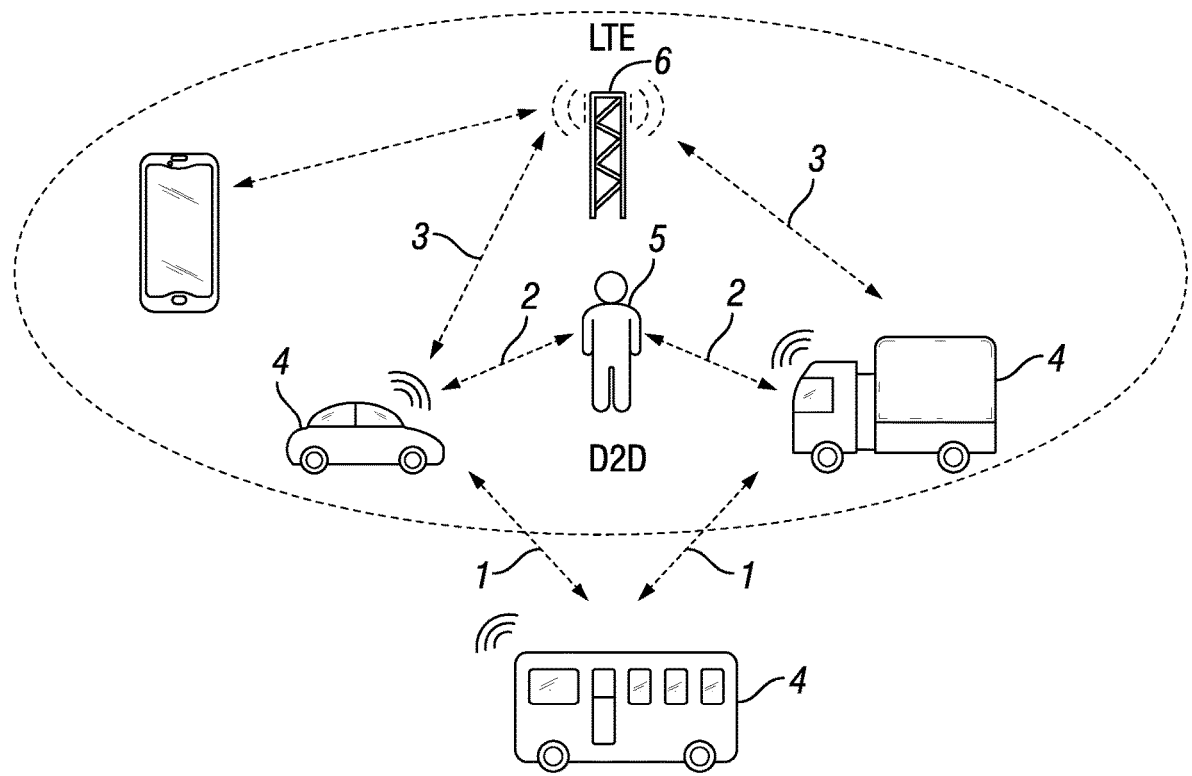
FIG. 1 (Prior Art) is an illustrative drawing illustrating various vehicle communication scenarios in an LTE-based network.
Figure 2:
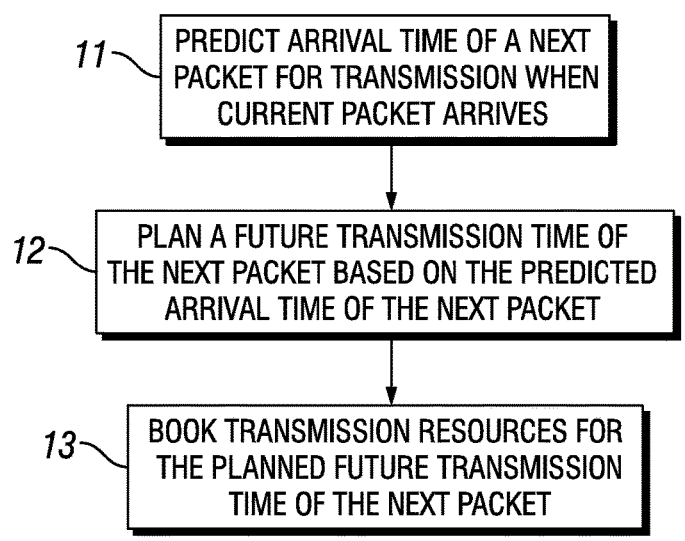
FIG. 2 is a flow chart illustrating the steps of an overall exemplary embodiment of the method of the present disclosure.

FIG. 2 is a flow chart illustrating the steps of an overall exemplary embodiment of the method of the present disclosure. The method provides a method of scheduling transmissions from a communication device, such as, for example, a wireless communication device such as a UE. At step 11, the communication device predicts an arrival time of a next packet for transmission when a current packet arrives. At step 12, the communication device plans a future transmission time of the next packet based on the predicted arrival time of the next packet. At step 13, the communication device books transmission resources for the planned future transmission time of the next packet.

Figure 3:
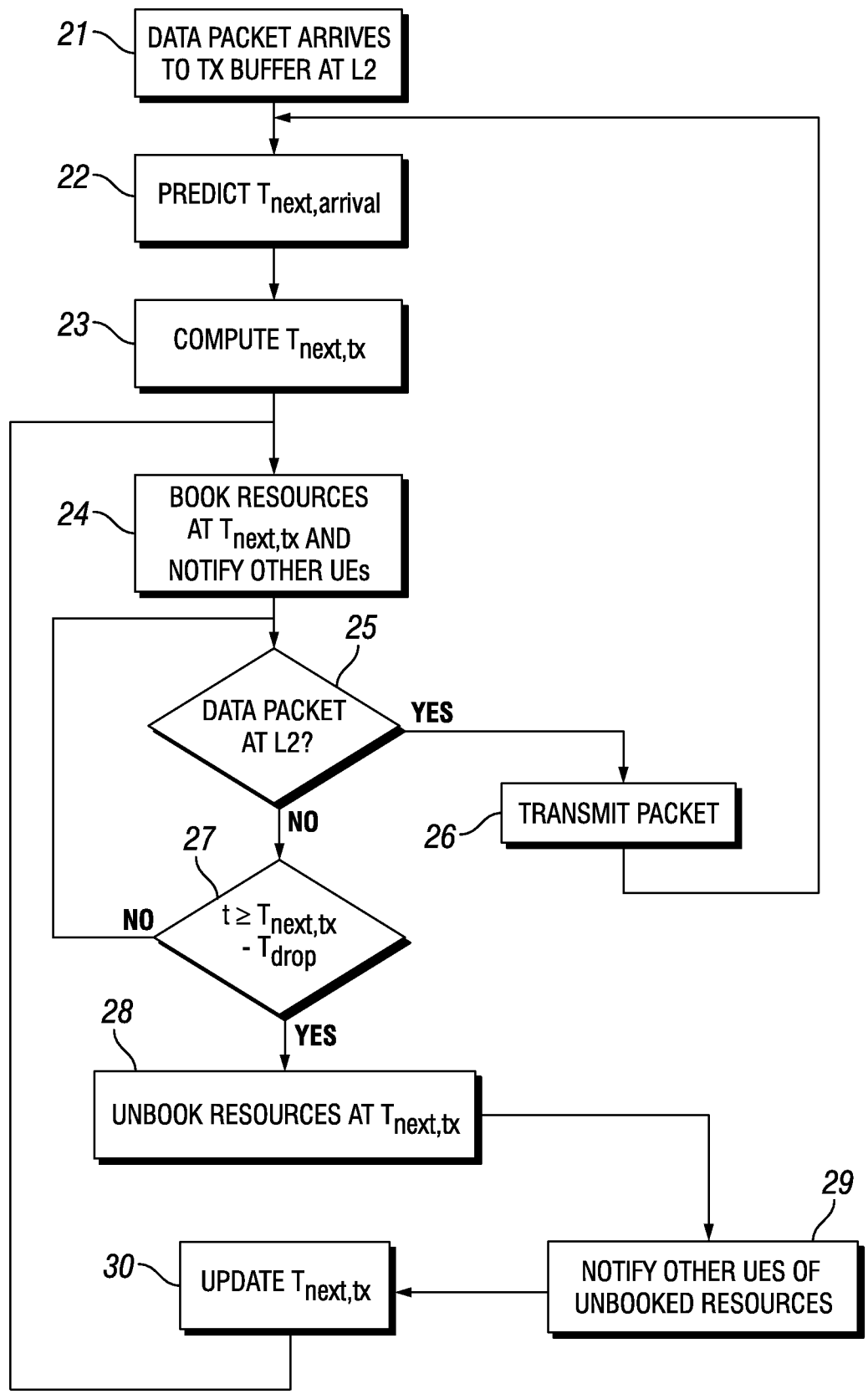
FIG. 3 is a flow chart illustrating in more detail, the steps of an exemplary embodiment of the method of the present disclosure.

FIG. 3 is a flow chart illustrating in more detail, the steps of an exemplary embodiment of the method of the present disclosure. The flow of FIG. 3 mainly addresses the booking and dropping of resources. In the method of the present disclosure, the UE is allowed book resources for future transmission. When the UE books resources, the UE informs other UEs of its intention to use those resources for transmission at the booked time. The UE that has booked some resources may drop the booking. The UE may only drop its own bookings. When the UE drops a booking, the UE informs other UEs that it no longer has the intention to use those resources for transmission at the booked time. The UE may drop a booking (corresponding to resources previously booked) and at the same time book some other resources for future transmission.

Future packet arrivals to the L2 transmit buffer do not occur at deterministic times. The method of FIG. 3 enables efficient semi-persistent transmissions by introducing the booking and dropping of resources for future utilization. The disclosed method (and associated apparatus) for scheduling the transmission of packets without being constrained to utilizing totally synchronous/asynchronous scheduling procedures consists of at least a subset of the following steps, illustrated in FIG. 3, in particular steps 22-24.

At step 21, a data packet arrives at the transmit (TX) buffer of a UE at Layer 2 (L2). At step 22, the UE predicts (for example, derives, estimates, or measures) the time of arrival (Tnext,arrival) of a future (for example the next) packet for transmission. The term "time of arrival of a future packet" is intended as the time at which a packet arrives to some transmission buffer in the UE (for example the transmit buffer at Layer 2) from the function generating the packet in the UE. The prediction is based, at least in part, on the arrival time of two or more packets that have arrived previously. The Tnext,arrival for the next packet may be determined when a new packet arrives in the UE.

At step 23, the UE uses the predicted value Tnext,arrival, to determine a potential time (Tnext,tx) for transmitting the next data packet. In other words, the UE plans the transmittal. At step 24, the UE books transmission resources, including signaling to other UEs its intention to transmit the next data packet at the determined transmission time, Tnext, tx. The UE then waits for a new data packet to arrive at its transmit buffer. The UE updates the value for Tnext,tx every time it schedules a new transmission.

At step 25, the UE determines whether there is a data packet in the UE's TX buffer at L2. When a data packet is in the TX buffer at L2, the UE transmits the packet at step 26, and the method returns to step 22 and repeats steps 22-25 for the next data packet. When a data packet is not in the TX buffer at L2, the method moves to step 27 and determines whether t Tnext,tx-Tdrop. Tdrop is a value known by the UE. If a new packet arrives before t=Tnext,tx-Tdrop, the UE may transmit the packet and return to step 22. When t Tnext,tx-Tdrop, and no packet has arrived, the UE may drop the booking of transmission resources at step 28. At step 29, the UE may notify other UEs of its intention not to use transmission resources at t=Tnext,tx. To drop the booking, the UE may transmit a new Scheduling Assignment (SA) packet, at least Tdrop seconds before the booked resources. At step 30, the UE may update Tnext,tx. The method then returns to step 24. The UE may, however, also use Tnext,tx without Tdrop, in essence the case where Tdrop=0.

The SA may include:
- an indication such as a 1-bit flag for booking resources for use after Tnext,tx;
- an indication such as a 1-bit flag for informing other UEs that the UE will not use the coming booked resources (dropping a booking); and
- a value of Tnext,tx. Tnext,tx is obtained as a function (for example upwards rounding and quantization) of the predicted arrival time for the next packet relative to the transmission time of the current SA. The value of Tnext,tx is updated for SA scheduling the transmission of a new Transport Block (TB).

In the following, a more detailed description of FIG. 3 is provided.

The actual time of arrival of the packet, Tarrival, as specified in the steps below may be the packet arrival time at the transmission buffer. This may be a layer 2 buffer for outgoing transmissions. The UE may also use equivalent time stamps or other time-related properties of the packets (such as the packet generation time by the application that generates the packet) for Tarrival. Tarrival may be specified as absolute time or as relative time interval in relation to a transmission interval.

Regarding step 22, in some embodiments, the data packet may be a transport block, for example, an LTE transport block. In some embodiments, Tnext,arrival may be computed as a function of the arrival times of all the previous packets: Tnext,arrival=F(Tarrival,1, Tarrival,2, ..., Tarrival, i), where F(.) is a function, i is the total number of packets that have previously arrived, and Tarrival,k is the time of arrival of the kth packet, with k being an integer 1, 2, ... i.

In some embodiments, Tnext,arrival may be computed as a function of the arrival times of the N previous most recent packets: Tnext,arrival=F(Tarrival,i−N+1, Tarrival,i−N+2, . . . , Tarrival,i), where F(.) is a function, i is the total number of packets that have previously arrived and Tarrival,k is the time of arrival of the kth packet with k being 1, 2, . . . i. This provides a moving window for the prediction of Tnext,arrival which is advantages to quicker adapt to changes in the arrival intervals of the packets. An example is the case of N=2, Tnext,arrival=F(Tarrival,i−1,Tarrival,i). A further example is Tnext,arrival=2*Tarrival,1−Tarrival,i−1+β, where β is some tolerance margin. The tolerance margin β may be preconfigured or specified (e.g., in a standard), or may be signaled by a network node (e.g., an eNB), or may be set by the UE according to a UE-specific implementation.

In some situations, a new communication sequence starts. In that case, there is no arrival or only one arrival. These situations are taken into account in step 24.

Regarding step 23, in some embodiments, Tnext,tx may be computed as a function of Tnext,arrival alone: Tnext,tx=F(Tnext,arrival). Another example is Tnext,tx=Tnext,arrival+α, where a is a parameter providing a minimum time between the packet arriving and the actual transmission of that packet. In various embodiments, the parameter α may be omitted (α=0); the parameter α may be preconfigured or specified (e.g., in a standard); the parameter α may be signaled by a network node (e.g., an eNB); or the parameter α may be set by the UE according to an internal implementation. The parameter α may be a fraction of the transmission interval or several transmissions intervals.

In some embodiments, Tnext,tx may be computed as a function of Tnext,arrival and the current time t: Tnext,tx=F (Tnext,arrival,t). In other embodiments, Tnext,tx may be computed as a function of Tnext,arrival and the transmission time Tcurrent,tx of the current packet: Tnext,tx=F(Tnext, arrival, Tcurrent,tx). For example, Tnext,tx=Tcurrent,tx+Q (Tnext,arrival−Tcurrent,tx), where Q(.) is a function that discretizes its argument rounding upwards. Such a quantization step is needed, for example, when the value of Tnext,tx needs to be signaled using a digital format as in step 24.

Regarding step 24, let Tcurrent,tx be the time at which the UE transmits a first (i.e., the current) packet. Such packet may refer to a data or control information transmission. In some embodiments, the first packet may be transmitted in previously booked resources (for example, as described in steps 25-30). In other embodiments, the packet may be transmitted in resources that have not previously been booked (for example, because no booking has been performed or all previous bookings have expired or have been un-booked).

In some embodiments, the packet may be transmitted (at time Tcurrent,tx) in resources different from the ones that have previously been booked for transmission at time Tbooked>Tcurrent,tx (i.e., the booking has not passed or expired). For example, the UE may transmit the packet in different resources if Tbooked is too far in the future (for example to meet the latency requirements of the packet to transmit). In other related embodiments, the UE may not unbook the resources booked at Tbooked. For example, the UE may use them at a later time. Alternatively, the UE may unbook the resources booked at Tbooked.

In some embodiments, a UE may simultaneously transmit the data packet (if any) and book resources for transmission at t=Tnext,tx. In some embodiments, a UE may book resources for a second transmission at t=Tnext,tx using the same control channel transmission (e.g., a scheduling assignment on PSCCH) used to schedule the first transmission. In some embodiments, the booking may be explicit. For example, by transmitting the data packet at time Tcurrent,tx, it is assumed that the UE will also transmit at time Tnext,tx=Tcurrent,tx+ρ, where ρ is a parameter. ρ may be signaled by a network node (e.g., an eNB), or, p may be set by the UE according to an internal implementation. In some embodiments, specific signals (e.g., control signals) are used to inform other UEs about the booking.

In steps 25-30, the UE either transmits the packet when it arrives in time, or the UE performs one or more actions when no packet arrives in time for transmission as provided below. In embodiments where Tdrop is used, Tdrop may be preconfigured or specified (e.g., in a standard), or Tdrop may be signaled by a network node (e.g., an eNB), or Tdrop may be set by the UE according an internal implementation. Tdrop may, for example, reflect the reasonable time for another UE to obtain information that a resource is unused and to schedule a transmission on such resource. In one embodiment, Tdrop may be approximately 4 ms.

In embodiments where the UE is allowed to unbook resources, the UE may need to unbook the resources booked for transmission at t=Tnext,tx exactly at time t=Tnext,tx−Tdrop. Alternatively the UE may be allowed to unbook the resources booked for transmission at t=Tnext,tx at any time t such that t≥Tnext,tx−Tdrop. In a further alternative embodiment, the UE may be allowed to unbook the resources booked for transmission at t=Tnext,tx at any time t such that Tnext,tx−Tdrop,max Tnext,tx−Tdrop, where Tdrop,max is a parameter. Tdrop,max may be preconfigured or specified (e.g., in a standard), or may be signaled by a network node (e.g., an eNB), or may be set by the UE according to an internal implementation.

In some embodiments, a UE that drops a booking can create one more booking of resources. In this case, the UE choses the minimum possible value for Tnext,tx (here denoted as Tmin). Furthermore, a UE may be allowed to book resources consecutively two or more times without using them for transmission. In some embodiments, the number of consecutive times that resources can be un-booked by a UE without transmission may be limited. In some embodiments, the updated value of Tnext,tx may be obtained as a function of the current value: Tnext,tx, updated=F(Tnext,tx,current). For example, when there is a fixed list of values that Tnext,tx can take, the update may consist of taking the next value in the list or the largest value in the list.

Before the first transmission corresponding to every TB, a UE may send an SA alone to drop a coming booking. The SA may be sent in advance of the booked resource, for example five (5) TTIs in advance. This SA may still book resources in the future, in which case Tnext,tx may be used. When dropping a booking, the UE may book new resources for Tnext,tx=100 ms (for example). The UE may be blocked from booking additional resources after dropping N (for example 1-3) consecutive bookings. UEs always need to follow the sensing rules regarding the resources used by other UEs (for example when changing periodicity, when transmitting SA alone to drop a booking, and the like).

It should be noted that different functions may be used in different steps of FIG. 3. That is, the function F(.) may not be the same in all parts of this disclosure. In some embodiments, the functions and parameters in the steps above are fixed. In some embodiments, some of the functions and/or parameters may change over time.

Figure 4:
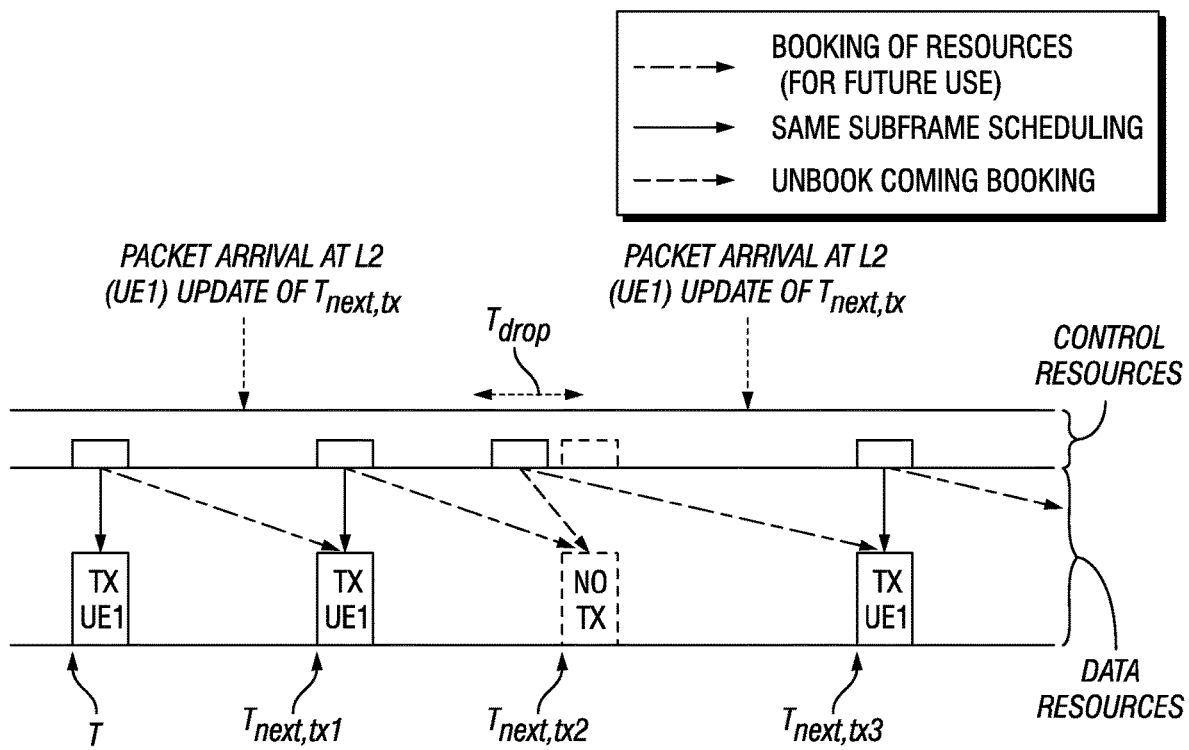
FIG. 4 is a timeline illustrating an example of communication scheduling in accordance with a first embodiment of the present disclosure.

FIG. 4 is a timeline illustrating an example of communication scheduling in accordance with a first embodiment of the present disclosure. Two types of radio resources—control resources and data resources are used. On control resources, only control information is transmitted, including information about current transmission and bookings for future transmissions.

UE1 performs a first transmission at time T and books resources for a next transmission at Tnext,tx1. A packet arrives before Tnext,tx1, and UE1 transmits the packet on the booked resources at Tnext,tx1. The transmission consists of transmitting the data packet along with its control information and booking new transmission resources at Tnext,tx2. This time, however, no packet arrives before Tnext,tx2, and the UE is forced to drop the booking at Tnext,tx2 and obtain a new booking of transmission resources at Tnext,tx3. The process continues as shown in FIG. 3.

Even though the disclosure uses the example of a UE as a wireless device, the disclosed method may be implemented in any network node or device. For example, a network node (e.g., eNB or access point) may implement any of the steps described above. In one example, the prediction is carried out at the eNB for transmissions performed by a UE, in which case some signaling between the UE and eNB is necessary for enabling awareness of the transmission times and packet arrival times at the eNB and UE.

Figure 5:
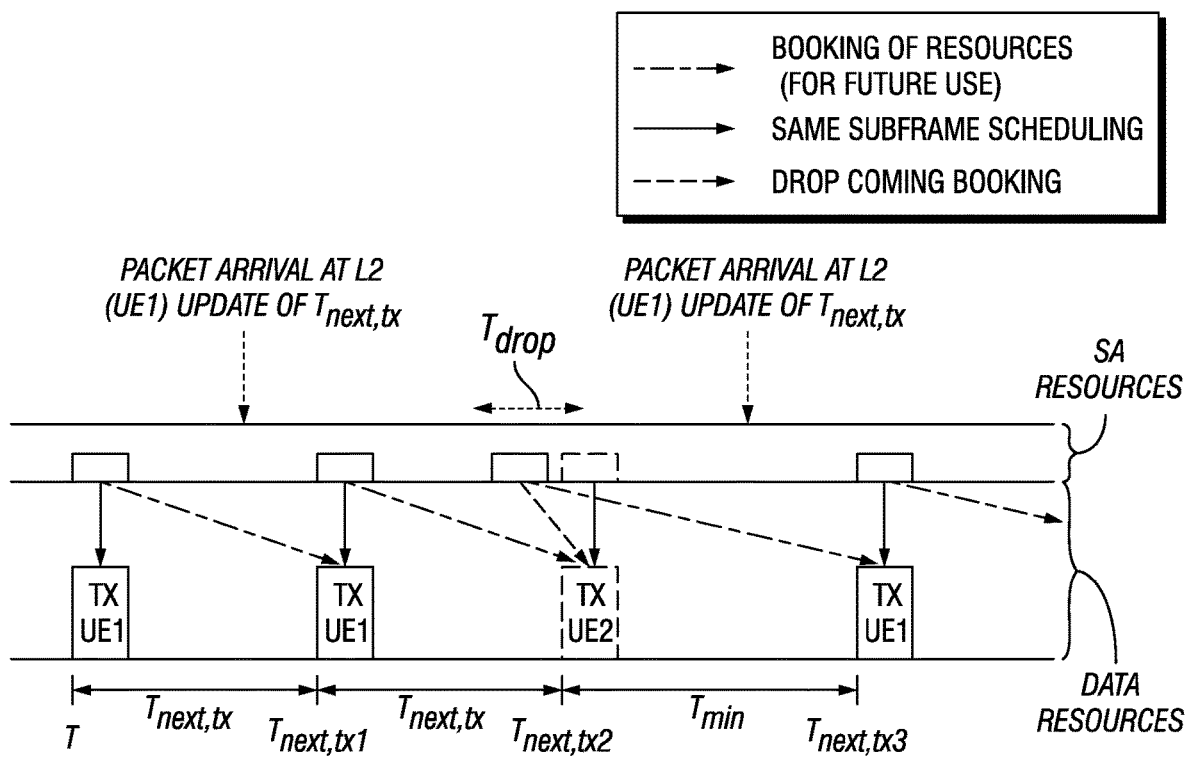
FIG. 5 is a timeline illustrating an example of communication scheduling in accordance with a second embodiment of the present disclosure.

FIG. 5 is a timeline illustrating an example of communication scheduling in accordance with a second embodiment of the present disclosure. In this embodiment, the resources un-booked by UE1 may be utilized by other UEs to transmit. As shown, no packet arrives before Tnext,tx2, and UE1 is forced to drop the booking at Tnext,tx2 and obtain a new booking of transmission resources at Tnext,tx3. When UE1 transmits an SA informing other UEs that the booking has been dropped at Tnext,tx2, a new UE, UE2, takes advantage of the available resources and transmits its packet at tnext, tx2. Thus, the disclosed solution enables a UE to adapt the scheduling to messages that arrive later than expected.

Note that UEs using the scheduling procedure described here need to follow the rules agreed for sensing. For example, a UE may not transmit the SA used for dropping a booking if the UE has sensed that those resources are booked by another UE. Similarly, if a UE senses that some resources are booked by another UE, it may not book them for its own use. For example, in FIG. 5, UE2 is not allowed to book resources after Tnext,tx=Tmin since these are already booked by UE1.

Figure 6:
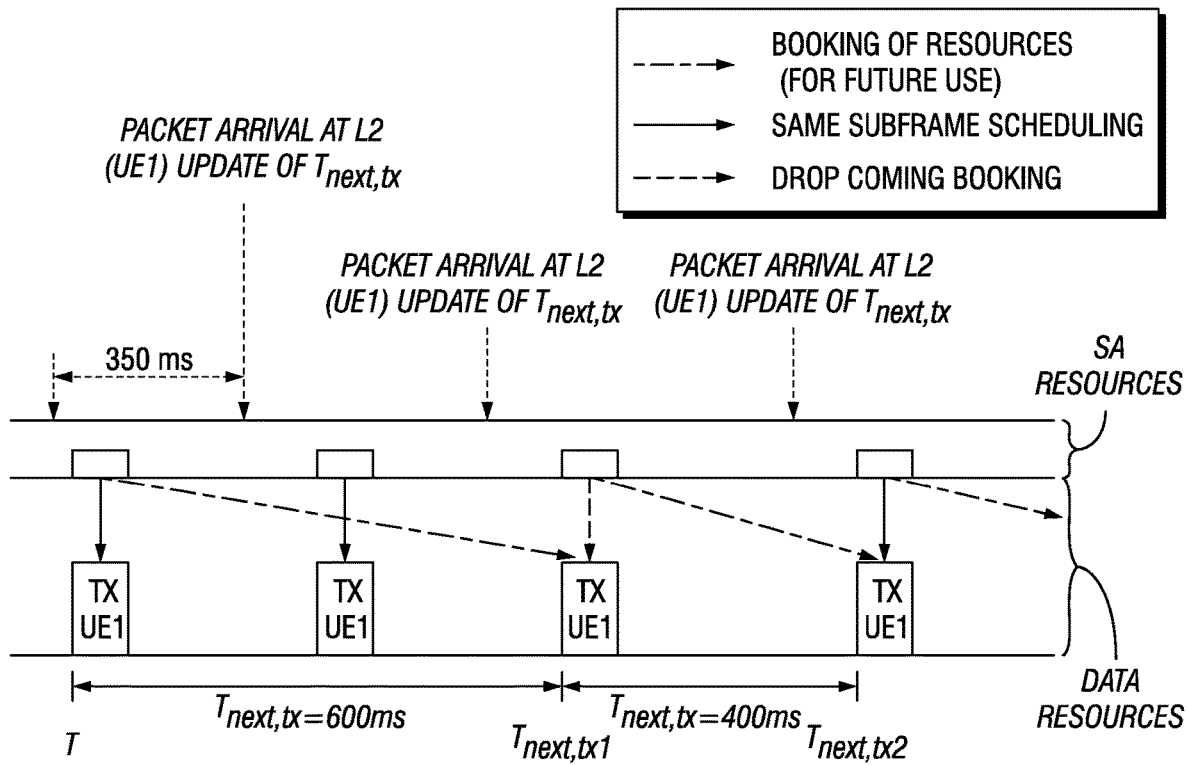
FIG. 6 is a timeline illustrating an example of communication scheduling in accordance with a third embodiment of the present disclosure.

FIG. 6 is a timeline illustrating an example of communication scheduling in accordance with a third embodiment of the present disclosure. In this embodiment, the UE can schedule new transmissions for messages that arrive earlier than expected. As shown, the first two packets arrive separated by 350 ms. UE1 transmits the first packet at T and transmits the second packet upon receipt. A booking is made at Tnext,tx1 600 ms after T. UE1 can decide to keep this booking active or establish a new one and drop the previous one as described above. Since the first two packets arrived only 350 ms apart, UE1 adjusts the Tnext,tx interval from 600 ms to 400 ms.

Figure 7:
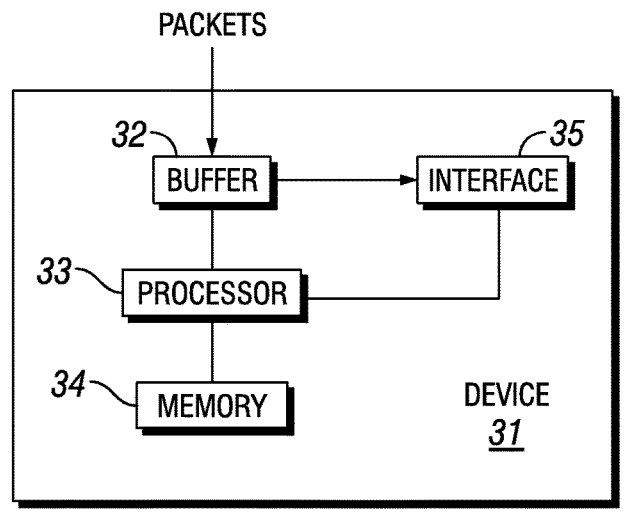
FIG. 7 is a simplified block diagram of an exemplary embodiment of a mobile device in accordance with the present disclosure.

FIG. 7 is a simplified block diagram of an exemplary embodiment of a device 31 in accordance with the present disclosure. The same architecture may also apply to other devices involved in a common communication sharing a medium such as an eNB.

The device 31 includes a buffer 32, processor 33, and memory 34 as well as an interface 35 for transmission of packets. The buffer may be construed as any means by which a packet is held prior to its transmission. Since transmission can only be done in a time slot, the packet needs to be completely assembled and ready for transmission at the buffer, from which the packet is retrieved when the transmission slot is there. The holding place might also be inside an application in the device that produces packets for transmission or in the memory of the device. Another example of the buffer is a Level 2 transmission buffer.

The interface 35 may be characterized by a transmitter for wireless transmission.

In different embodiments, the processor 33 may either scan the buffer 32 regularly or the processor is informed of new packets ready in the buffer (e.g., interrupt to the processor). The arrival of a packet is marked by means of a timestamp in the buffer or the reception time of the interrupt at the processor. Other examples are possible as ways to achieve the same result.

The method executed by the processor 33 may be provided for in the memory 34. The method instructs the processor to predict a next arrival time of a packet based on one or more previously received packets. This may be for packets belonging to the same communication or belonging to any communication. The method further instructs the processor to schedule a next transmission slot and book the resources for that as described earlier in step 24 of FIG. 2.

When a packet arrives at the device (the processor scans continuously or is interrupted) in time for the booked time slot, the processor causes the interface 35 to transmit the packet in the booked time slot. When a packet does not arrive in time for the booked time slot, the processor may perform any combination of options as provided by steps 25-28 of FIG. 3. The actions of the processor are described by way of the sequence of steps as provided earlier in the description. For actual implementation, however, steps may be combined, split, or otherwise altered in sequence.

The disclosed method is described for data packets transmission, but the same principles may be used for booking and signaling transmissions of any other content (for example, control information that may be associated with certain data transmissions).

Figure 8:
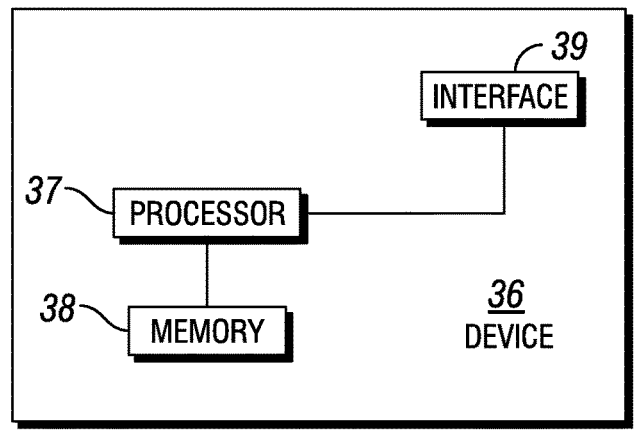
FIG. 8 is a simplified block diagram of a second exemplary embodiment of a device in accordance with the present disclosure.

FIG. 8 is a simplified block diagram of a second exemplary embodiment of a device 36 in accordance with the present disclosure. The device includes a processor 37, connected to a memory 38 and an interface 39. The processor is adapted to execute a method provided for by instructions in the memory, the instructions causing the processor to receive information about a planned transmission time, and avoid using the planned transmission time. The interface may be characterized by a transmitter for wireless transmission.

Figure 10:
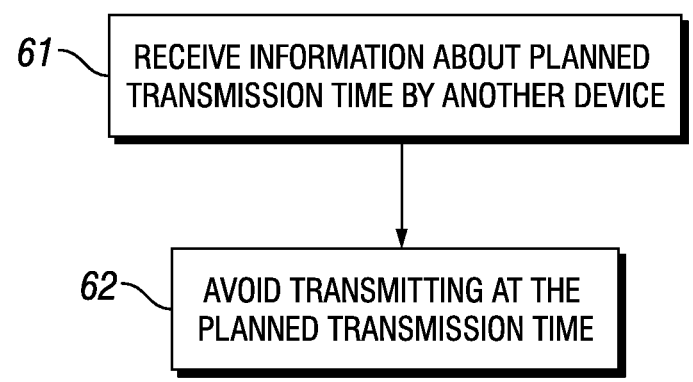
FIG. 10 is a flow chart illustrating the steps of an exemplary embodiment of a method performed by the device of FIG. 8.

Referring briefly to FIG. 10, there is shown a flow chart illustrating the steps of an exemplary embodiment of a method performed by the device of FIG. 8. The device is a communication device within a plurality of communication devices involved in a communication using a shared medium. At step 61, the device receives information about a planned transmission time by another communication device within the plurality of communication devices. At step 62, the device avoids transmitting at the planned transmission time.

Figure 9:
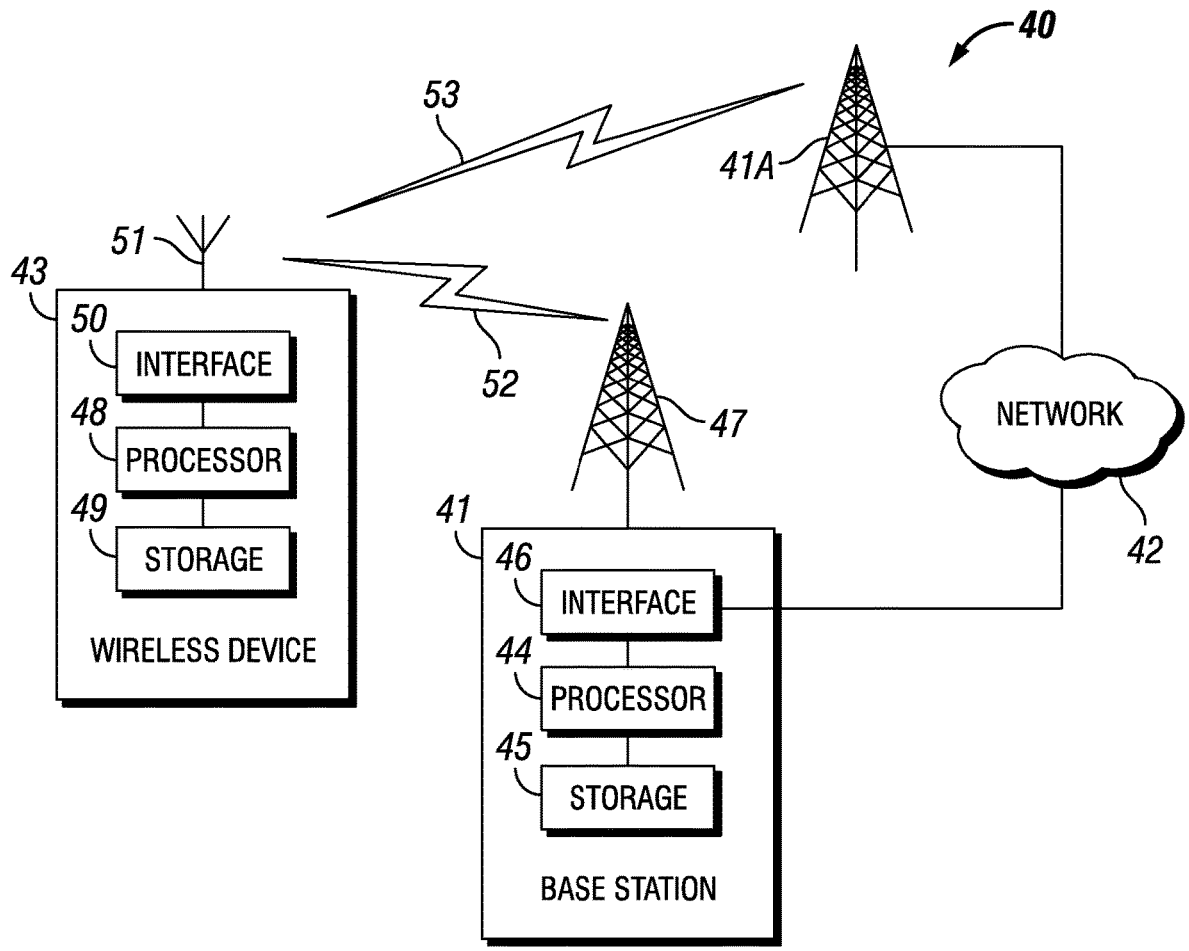
FIG. 9 is a block diagram of an exemplary embodiment of a wireless network implementing the system of the present disclosure.

Referring now to FIG. 9, an exemplary embodiment is shown of a wireless network implementing the system 40 of the present disclosure. The network includes a network node 41 (a base station in this example), a second network node 41a, and a connecting network 42. A plurality of wireless devices represented by wireless device (WD) 43 communicates with the network nodes.

Network node 41 includes a processor 44, a storage device 45, an interface 46, and an antenna 47. Similarly, WD 43 includes a processor 48, a storage device 49, an interface 50 and an antenna 51. These components may work together in order to provide network node and/or wireless device functionality, such as providing wireless connections 52-53 in a wireless network. In different embodiments, the wireless network may comprise any number of wired or wireless networks, network nodes, base stations, controllers, wireless devices, relay stations, and/or any other components that may facilitate or participate in the communication of data and/or signals whether via wired or wireless connections.

The network 42 may include one or more IP networks, public switched telephone networks (PSTNs), packet data networks, optical networks, wide area networks (WANs), local area networks (LANs), wireless local area networks (WLANs), wired networks, wireless networks, metropolitan area networks, and other networks to enable communication between devices.

The components of the network node 41 are depicted as single boxes located within a single larger box. In practice however, a network node may include multiple different physical components that make up a single illustrated component (for example the interface 46 may include terminals for coupling wires for a wired connection and a radio transceiver for a wireless connection). As another example, the network node 41 may be a virtual network node in which multiple different physically separate components interact to provide the functionality of the network node (for example the processor 44 may include three separate processors located in three separate enclosures, where each processor is responsible for a different function for a particular instance of the network node). Similarly, the network node 41 may include multiple physically separate components (for example a NodeB component and a Radio Network Controller (RNC) component, a Base Transceiver Station (BTS) component, a Base Station Controller (BSC) component, and the like), which may each have their own respective processor, storage, and interface components. In certain scenarios in which the network node includes multiple separate components (for example BTS and BSC components), one or more of the separate components may be shared among several network nodes. For example, a single RNC may control multiple NodeBs. In such a scenario, each unique NodeB and BSC pair, may be a separate network node. In some embodiments, the network node 41 may be configured to support multiple Radio Access Technologies (RATs). In such embodiments, some components may be duplicated (for example, there may be a separate storage device 45 for the different RATs) and some components may be reused (for example, the same antenna 47 may be shared by the RATs).

The processor 44 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide (either alone or in conjunction with other network node components such as the storage device 45) network node functionality. For example, the processor 44 may execute instructions stored in the storage device 45. Such functionality may include providing various wireless features discussed herein to wireless devices, such as WD 43, including any of the features or benefits disclosed herein.

The storage device 45 may be any form of volatile or non-volatile computer readable memory including, without limitation, persistent storage, solid state memory, remotely mounted memory, magnetic media, optical media, random access memory (RAM), read-only memory (ROM), removable media, or any other suitable local or remote memory component. The storage device may store any suitable instructions, data or information, including software and encoded logic, utilized by the network node 41. The storage device may be used to store any calculations made by the processor 44 and/or any data received via the interface 46.

The interface 46 may be used in the wired or wireless communication of signaling and/or data between the network node 41, the network 42, and/or the WD 43. For example, the interface may perform any formatting, coding, or translating that may be needed to allow the network node to send and receive data from the network 42 over a wired connection. The interface 46 may also include a radio transmitter and/or receiver that may be coupled to or a part of the antenna 47. The radio transmitter may receive digital data that is to be sent out to other network nodes or WDs via a wireless connection. The radio transmitter may convert the digital data into a radio signal having the appropriate channel and bandwidth parameters. The radio signal may then be transmitted via the antenna 47 to the appropriate recipient (e.g., WD 43).

The antenna 47 may be any type of antenna capable of transmitting and receiving data and/or signals wirelessly. In some embodiments, the antenna may include one or more omnidirectional, sector, or panel antennas operable to transmit/receive radio signals in a frequency range of, for example, 2-66 GHz. An omnidirectional antenna may be used to transmit/receive radio signals in any direction; a sector antenna may be used to transmit/receive radio signals from devices within a particular area; and a panel antenna may be a line-of-sight antenna used to transmit/receive radio signals in a relatively straight line.

The WD 43 may be any type of wireless endpoint, mobile station, mobile phone, wireless local loop phone, smartphone, user equipment, desktop computer, PDA, cell phone, tablet, laptop, VoIP phone or handset, which is able to wirelessly send and receive data and/or signals to and from a network node, such as network node 41 and/or other WDs. Like the network node, the components of the WD 43 are depicted as single boxes located within a single larger box, however in practice, a wireless device may include multiple different physical components that make up a single illustrated component (for example the storage device 49 may include multiple discrete microchips, each microchip representing a portion of the total storage capacity).

The processor 48 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide (either alone or in combination with other WD components such as the storage device 49) WD functionality. Such functionality may include providing various wireless features discussed herein, including any of the features or benefits disclosed herein.

The storage device 49 may be any form of volatile or non-volatile memory including, without limitation, persistent storage, solid state memory, remotely mounted memory, magnetic media, optical media, random access memory (RAM), read-only memory (ROM), removable media, or any other suitable local or remote memory component. The storage device may store any suitable data, instructions, or information, including software and encoded logic, utilized by the WD 43. The storage device may be used to store any calculations made by the processor 48 and/or any data received via the interface 50.

The interface 50 may be used in the wireless communication of signaling and/or data between the WD 43 and the network node 41. For example, the interface 50 may perform any formatting, coding, or translating that may be needed to allow the WD to send and receive data from the network node over a wireless connection. The interface may also include a radio transmitter and/or receiver that may be coupled to or a part of the antenna 51. The radio transmitter may receive digital data that is to be sent out to the network node 41 via a wireless connection. The radio transmitter may convert the digital data into a radio signal having the appropriate channel and bandwidth parameters. The radio signal may then be transmitted via the antenna 57 to the network node.

The antenna 51 may be any type of antenna capable of transmitting and receiving data and/or signals wirelessly. In some embodiments, the antenna may include one or more omnidirectional, sector or panel antennas operable to transmit/receive radio signals in a frequency range of, for example, 2-66 GHz. For simplicity, the antenna 51 may be considered a part of the interface 50 to the extent that a wireless signal is being used.

Any steps described herein are merely illustrative of certain embodiments. It is not required that all embodiments incorporate all the steps disclosed nor that the steps be performed in the exact order depicted or described herein. Furthermore, some embodiments may include steps not illustrated or described herein, including steps inherent to one or more of the steps disclosed herein.

Any appropriate steps, methods, or functions may be performed through a computer program product that may, for example, be executed by the components and equipment illustrated in the figure above. For example, the storage device 45 may comprise computer readable means on which a computer program can be stored. The computer program may include instructions that cause the processor 48 (and any operatively coupled entities and devices, such as the interface 46 and the storage device 45) to execute methods according to embodiments described herein. The computer program and/or computer program product may thus provide means for performing any steps herein disclosed.

Any appropriate steps, methods, or functions may be performed through one or more functional modules. Each functional module may comprise software, computer programs, sub-routines, libraries, source code, or any other form of executable instructions that are executed by, for example, a processor. In some embodiments, each functional module may be implemented in hardware and/or in software. For example, one or more or all functional modules may be implemented by the processors 44 and/or 48, possibly in cooperation with the storage devices 45 and/or 49. The processors and storage devices may thus be arranged to allow the processors to fetch instructions from the storage devices and execute the fetched instructions to allow the respective functional module to perform any steps or functions disclosed herein.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A method of scheduling transmissions from a communication device, the method comprising:
   predicting an arrival time of a next packet for transmission when or after a current packet arrives;
   planning a future transmission time of the next packet based on the predicted arrival time of the next packet; and
   booking transmission resources for the planned future transmission time of the next packet.

2. The method according to claim 1, wherein predicting includes predicting the arrival time of the next packet for transmission based on arrival times of N most recently received packets.

3. The method according to claim 1, wherein planning a future transmission time of the next packet includes utilizing a planning method selected from a group consisting of:
   computing the future transmission time as a function of the predicted arrival time of the next packet alone;
   computing the future transmission time as a function of the predicted arrival time of the next packet plus a parameter providing a minimum time between the arrival time of the next packet and the actual transmission of the next packet;
   computing the future transmission time as a function of the predicted arrival time of the next packet and the current time; and
   computing the future transmission time as a function of the predicted arrival time of the next packet and the transmission time of the current packet.

4. The method according to claim 1, further comprising:
   determining whether the next packet has arrived before the planned future transmission time of the next packet; and
   transmitting the next packet in response to determining that the next packet has arrived before the planned future transmission time of the next packet.

5. The method according to claim 4, further comprising:
   re-planning the future transmission time of the next packet in response to determining that the next packet has not arrived before the planned future transmission time of the next packet.

6. The method according to claim 1, further comprising:
   determining whether the next packet has arrived before a defined time period (Tdrop) prior to the planned future transmission time; and
   transmitting the next packet in response to determining that the next packet has arrived before the Tdrop time period prior to the planned future transmission time of the next packet.

7. The method according to claim 6, further comprising, in response to determining that the next packet has not arrived before the Tdrop time period prior to the planned future transmission time of the next packet:
   re-planning the future transmission time of the next packet;
   unbooking the transmission resources for the planned future transmission time of the next packet; and
   booking transmission resources for the re-planned future transmission time of the next packet.

8. The method according to claim 7, further comprising notifying other communication devices that the unbooked transmission resources are available for use by the other communication devices.

9. The method according to claim 8, wherein notifying includes sending a control information packet at least the Tdrop time period before the planned future transmission time, the control information packet including:

an indicator for booking transmission resources for the re-planned future transmission time of the next packet;
an indicator for informing the other communication devices that the communication device will not use the booked transmission resources for the planned future transmission time of the next packet; and
a value indicating the planned future transmission time of the unbooked transmission resources.

10. The method according to claim 1, wherein the communication device is a wireless communication device.

11. A communication device, comprising:
a processor;
a non-transitory memory for storing instructions executable by the processor;
a transmit buffer connected to the processor; and
an interface connected to the processor for transmitting packets from the communication device;
wherein, when or after a current packet arrives in the transmit buffer, the processor is configured to execute the instructions in the memory, thereby causing the processor to:
predict an arrival time of a next packet for transmission;
plan a future transmission time of the next packet based on the predicted arrival time of the next packet; and
book transmission resources for the planned future transmission time of the next packet.

12. The communication device according to claim 11, wherein the processor is configured to predict the arrival time of the next packet for transmission based on arrival times of N most recently received packets.

13. The communication device according to claim 11, wherein the processor is configured to plan a future transmission time of the next packet utilizing a planning method selected from a group consisting of:
computing the future transmission time as a function of the predicted arrival time of the next packet alone;
computing the future transmission time as a function of the predicted arrival time of the next packet plus a parameter providing a minimum time between the arrival time of the next packet and the actual transmission of the next packet;
computing the future transmission time as a function of the predicted arrival time of the next packet and the current time; and
computing the future transmission time as a function of the predicted arrival time of the next packet and the transmission time of the current packet.

14. The communication device according to claim 11, wherein the processor is further configured to:
determine whether the next packet has arrived before a defined time period (Tdrop) prior to the planned future transmission time; and
transmit the next packet in response to determining that the next packet has arrived before the Tdrop time period prior to the planned future transmission time of the next packet.

15. The communication device according to claim 14, wherein, in response to determining that the next packet has not arrived before the Tdrop time period prior to the planned future transmission time of the next packet, the processor is further configured to:
re-plan the future transmission time of the next packet;
unbook the transmission resources for the planned future transmission time of the next packet; and
book transmission resources for the re-planned future transmission time of the next packet.

16. The communication device according to claim 15, wherein the processor is further configured to notify other communication devices that the unbooked transmission resources are available for use by the other communication devices.

17. The communication device according to claim 16, wherein the processor is configured to notify the other communication devices by sending a control information packet at least the Tdrop time period before the planned future transmission time, the control information packet including:
an indicator for booking transmission resources for the re-planned future transmission time of the next packet;
an indicator for informing the other communication devices that the communication device will not use the booked transmission resources for the planned future transmission time of the next packet; and
a value indicating the planned future transmission time of the unbooked transmission resources.

18. The communication device according to claim 11, wherein the communication device is a wireless communication device.

19. A system for scheduling transmissions from a plurality of communication devices involved in a communication using a shared medium, the system comprising:
within each of the plurality of communication devices, an apparatus comprising:
a processor;
a non-transitory memory for storing instructions executable by the processor and for buffering packets to be transmitted; and
an interface connected to the processor for transmitting packets from the communication device;
wherein, when or after a current packet arrives in the memory, the processor is configured to execute the instructions in the memory, thereby causing the processor to:
predict an arrival time of a next packet for transmission;
plan a future transmission time of the next packet based on the predicted arrival time of the next packet;
book transmission resources for the planned future transmission time of the next packet; and
notify other communication devices of the booked transmission resources.

20. The system according to claim 19, wherein the processor within each of the plurality of communication devices is further configured to predict the arrival time of the next packet for transmission based on arrival times of N most recently received packets.

21. The system according to claim 19, wherein the processor within each of the plurality of communication devices is further configured to plan a future transmission time of the next packet utilizing a planning method selected from a group consisting of:
computing the future transmission time as a function of the predicted arrival time of the next packet alone;
computing the future transmission time as a function of the predicted arrival time of the next packet plus a parameter providing a minimum time between the arrival time of the next packet and the actual transmission of the next packet;
computing the future transmission time as a function of the predicted arrival time of the next packet and the current time; and computing the future transmission time as a function of the predicted arrival time of the next packet and the transmission time of the current packet.

22. The system according to claim 19, wherein the processor within each of the other communication devices is further configured to avoid transmitting at the planned future transmission time.

23. The system according to claim 19, wherein the processor within each of the plurality of communication devices is further configured to:
   determine whether the next packet has arrived before a defined time period (Tdrop) prior to the planned future transmission time; and
   transmit the next packet in response to determining that the next packet has arrived before the Tdrop time period prior to the planned future transmission time of the next packet.

24. The system according to claim 23, wherein, in response to determining that the next packet has not arrived before the Tdrop time period prior to the planned future transmission time of the next packet, the processor within each of the plurality of communication devices is further configured to:
   re-plan the future transmission time of the next packet;
   unbook the transmission resources for the planned future transmission time of the next packet; and
   book transmission resources for the re-planned future transmission time of the next packet.

25. The system according to claim 24, wherein the processor within each of the plurality of communication devices is further configured to notify the other communication devices that the unbooked transmission resources are available for use by the other communication devices.

26. The system according to claim 25, wherein the processor within each of the plurality of communication devices is configured to notify the other communication devices by sending a control information packet at least the Tdrop time period before the planned future transmission time, the control information packet including:
   an indicator for booking transmission resources for the re-planned future transmission time of the next packet;
   an indicator for informing the other communication devices that the communication device will not use the booked transmission resources for the planned future transmission time of the next packet; and
   a value indicating the planned future transmission time of the unbooked transmission resources.

27. The system according to claim 19, wherein the plurality of communication devices are wireless communication devices.

28. A method of scheduling transmissions from a communication device of a group of communication devices involved in common communication sharing a medium and where transmission scheduling is distributed among the group members, the method comprising:
   predicting an arrival time of a next packet for transmission in a transmit buffer when or after a current packet arrives;
   planning a future transmission time of the next packet based on the predicted arrival time of the next packet;
   booking transmission resources for the planned future transmission time of the next packet;
   notifying other communication devices of the group of communication devices of the planned future transmission time;
   determining whether the next packet has arrived before the planned future transmission time of the next packet;
   transmitting the next packet in response to determining that the next packet has arrived before the planned future transmission time of the next packet; and,
   unbooking the transmission resources for the planned future transmission time of the next packet in response to determining that the next packet has not arrived before the planned future transmission time of the next packet.

29. The method of claim 28, further comprising:
   notifying other communication devices that the unbooked transmission resources are available for use by the other communication devices.

30. A communication device of a group of communication devices involved in common communication sharing a medium and where transmission scheduling is distributed among the group members, the communication device comprising:
   a processor;
   a non-transitory memory for storing instructions executable by the processor;
   a transmit buffer connected to the processor; and
   an interface connected to the processor for transmitting packets from the communication device;
   the processor is configured to execute the instructions in the memory, thereby causing the processor when or after a current packet arrives in the transmit buffer to:
     predict an arrival time of a next packet for transmission in said transmit buffer;
     plan a future transmission time of the next packet based on the predicted arrival time of the next packet;
     book transmission resources for the planned future transmission time of the next packet;
     notify other communication devices of the group of communication devices of the planned future transmission time;
     determine whether the next packet has arrived before the planned future transmission time of the next packet;
     transmit the next packet in response to determining that the next packet has arrived before the planned future transmission time of the next packet; and,
     unbook the transmission resources for the planned future transmission time of the next packet.

31. The communication device of claim 30, wherein the processor is further configured to:
   notify the other communication devices that the unbooked transmission resources are available for use by the other communication devices.

32. A system for scheduling transmissions from a plurality of communication devices involved in a communication using a shared medium and where transmission scheduling is distributed among the plurality of communication devices, the system comprising:
   within each of the plurality of communication devices, an apparatus comprising:
     a processor;
     a storage unit for storing instructions executable by the processor and for buffering packets to be transmitted; and
     an interface connected to the processor for transmitting packets from the communication device;
     the processor is configured to execute the instructions in the storage unit, thereby causing the processor when or after a current packet arrives in the storage unit to:
       predict an arrival time of a next packet for transmission in said storage unit;

plan a future transmission time of the next packet based on the predicted arrival time of the next packet;

book transmission resources for the planned future transmission time of the next packet;

notify other communication devices of the plurality of communication devices of the planned future transmission time;

determine whether the next packet has arrived before the planned future transmission time of the next packet;

transmit the next packet in response to determining that the next packet has arrived before the planned future transmission time of the next packet; and, unbook the transmission resources for the planned future transmission time of the next packet in response to determining that the next packet has not arrived before the planned future transmission time of the next packet.

33. The system of claim 32, wherein the processor is further configured to:

notify the other communication devices that the unbooked transmission resources are available for use by the other communication devices.

* * * * *